3,671,194
SULFUR DIOXIDE CONVERSION
Edward S. Roberts, Bayside, N.Y., assignor to
Treadwell Corporation, New York, N.Y.
Filed May 1, 1970, Ser. No. 33,614
Int. Cl. C01b 17/76, 17/72
U.S. Cl. 23—176     7 Claims

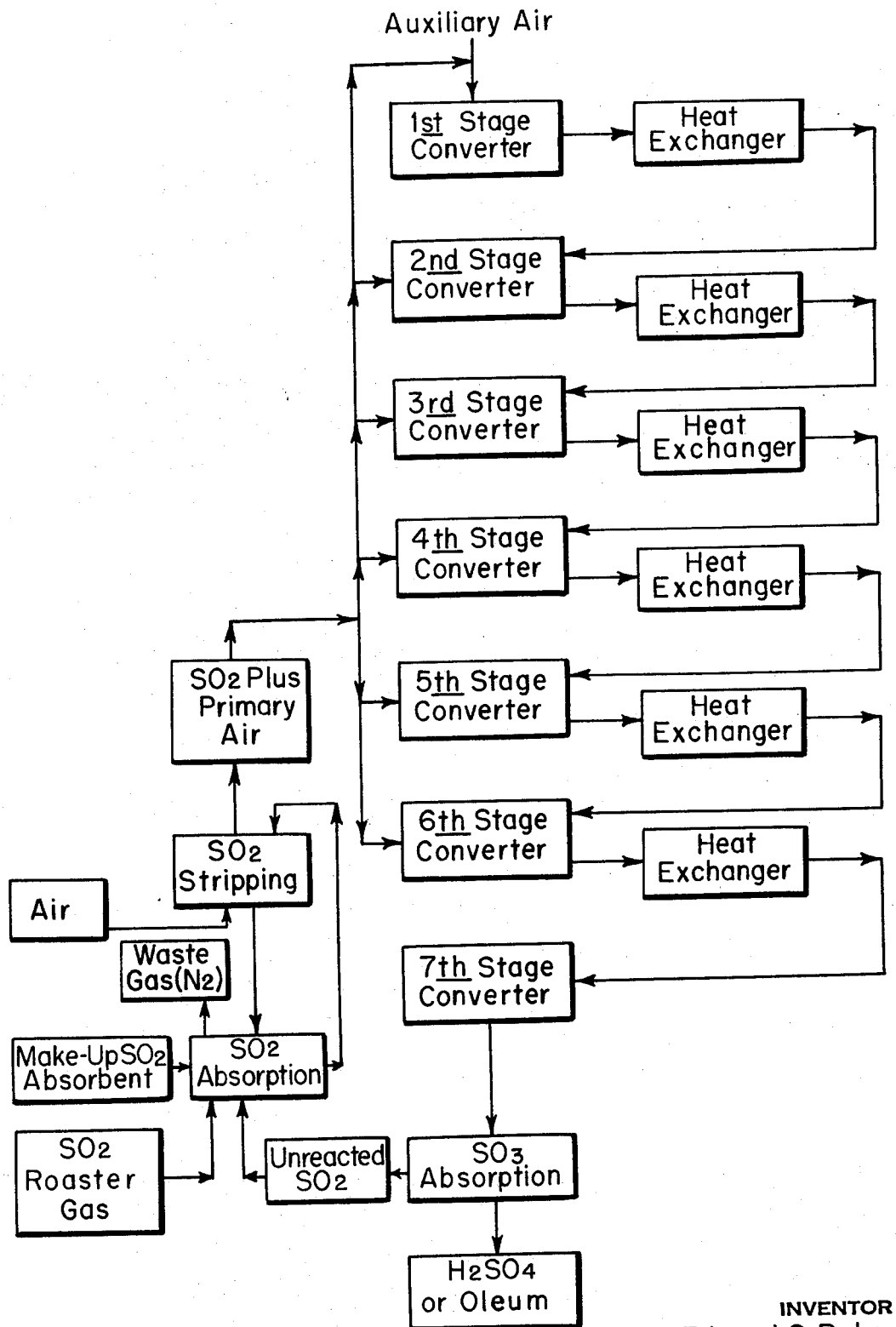

ABSTRACT OF THE DISCLOSURE

A multi-stage method for catalytic conversion of $SO_2$ to $SO_3$ which can utilize a high concentration of $SO_2$ in the feed gas and which is capable of producing a high $SO_3$ concentration in the product gas is provided. The process involves distributing a portion of the feed gas to each of a series of catalytic converters, and mixing such portion at each stage with the off-gas from the preceding stage. Some oxygen for the process may be supplied in admixture with the feed gas, and the remainder is admixed with the portion of feed gas delivered to the first converter stage. The feed gas and air supplied to the first stage, and the feed gas and off-gas supplied to subsequent stages, are proportioned so that the temperature rise of the gases in the converter does not exceed the safe value for the catalyst. The off-gas from each stage is cooled to near the ignition temperature for the conversion reaction before being introduced into the next stage.

BACKGROUND OF THE INVENTION

One method of producing sulfur trioxide ($SO_3$) is by the catalytic reaction between sulfur dioxide ($SO_2$) and oxygen ($O_2$). Such conversion of $SO_2$ to $SO_3$ is utilized most commonly in the production of sulfuric acid wherein the resultant $SO_3$ is absorbed in strong sulfuric acid or oleum. Such conversion of $SO_2$ to $SO_3$ has not, however, been efficient either as to the degree of conversion of $SO_2$ or as to expense of conversion.

Usually the gases from the $SO_3$ absorbers are discharged to the atmosphere. In this case the $SO_2$ content must be reduced to a low level in the off-gas to minimize both the economic loss and the atmospheric pollution by oxides. In variations of the usual method the gas from the $SO_3$ absorbers may be subjected to additional catalytic conversion and $SO_3$ absorption or it may be recycled to the primary converters.

When conversion is effected with the use of vanadium catalysts, the gas which enters each converter stage must be at a temperature of at least 400° C., and preferably 410–435° C. This is the so-called "ignition" temperature at which the reaction rate is sufficient to initiate a further temperature rise which produces reaction at an accelerated rate. Although the temperature rise is favorable with respect to the reaction kinetics, the effect is adverse on the reaction equilibrium. There is, moreover, an operating temperature limit for the effectiveness and stability of the catalyst and this limit must not be exceeded.

If the temperature and the catalyst quantity and activity are such that the final product gases of a converter stage are in equilibrium, the concentration of $SO_3$ in the final product is a function of the concentration of $SO_2$ and $O_2$. The rate of conversion also is a function of these concentrations, as well as increasing with increase in temperature. Hence dilution of the mixture of the reactive components ($SO_2$ and $O_2$) results in deterioration of both the maximum conversion at equilibrium and the rate of reaction.

Despite the manifold disadvantages of dilution and the recognition of the potential advantages of greatly reduced size and cost of catalytic converters when operating at high concentrations, it has been the practice in the industry to dilute the product gases of sulfur burners, containing about 10 percent each of sulfur dioxide and oxygen, with air to produce a mixture containing not more than 8 percent $SO_2$.

The reason for this dilution is that such a gas, entering the catalyst mass at 430° C., can generate sufficient heat to raise its temperature, and that of the catalyst, to 590° C. This temperature is close to the maximum limit permissible for the satisfactory operation of the catalyst. With a gas having the composition of sulfur burner gas (10% or more $SO_2$) there is considerable risk of overheating the catalyst.

It is, of course, possible to obtain gases which contain even a higher concentration of sulfur dioxide, e.g., by cryogenic separation or by absorption-desorption methods which are well known. In the prior art such rich gas mixtures could not be employed in contact acid plants without dilution, thereby losing the advantages of the reduction of the catalyst converter size which would otherwise accompany the use of the higher gas concentrations.

It is a purpose of this invention to permit the realization of the advantages of higher concentrations of sulfur dioxide in converter gas feed mixtures while controlling the heat evolution in order to maintain the temperatures of the catalyst within acceptable limits despite the highly exothermic reaction.

PRIOR ART

Among numerous alternatives and modifications of the basic process sequence proposed in the prior art for conversion of sulfur dioxide to sulfur trioxide and sulfuric acid is the splitting of the gas stream containing sulfur dioxide into sub-streams. Thus in U.S. Pat. No. 2,023,203 the sulfur dioxide-containing gas stream is split and a first portion is passed through a first converter for partial conversion, and is then cooled. The balance of the hot $SO_2$-containing gas stream is then added in order to compensate for possible overcooling by providing a heating effect to attain optimum temperature for further conversion. The combined gas stream is then passed through two other conversion stages in series folowed by absorption of $SO_3$.

In U.S. Pat. No. 2,104,858 a cool $SO_2$-containing gas is divided into two portions. A first portion is then reheated to conversion temperature and subjected to partial catalytic conversion without cooling. The resultant hot gas stream is cooled by addition of the cold second portion of the $SO_2$-containing gas stream.

In both of these methods of the prior art the stream of $SO_2$-containing gas is split for the purpose of moderating the temperature of the gas entering the subsequent stage and not to control the temperature attained during conversion. Furthermore, neither of these two methods is especially useful for increasing the $SO_2$ concentration in the gas feed to the systetm.

In the further improvement claimed in U.S. Pat. No. 3,350,169 by Rinckhoff the method of U.S. Pat. No. 2,104,858 is combined with an $SO_3$ absorption between the two stages of conversion. This enables the obtaining of a much greater conversion efficiency owing to the more favorable equilibrium in the second converter stage resulting from removal of the $SO_3$ which is produced in the first stage. However, the economic advantage of this is negated in large measure by the requirement of a large and expensive heat exchanger to cool the gases from the first converter stage prior to absorption and to reheat the gases from the absorber.

In U.S. Pat. 2,128,108, a recycle stream from the converter's exit, after absorbing the $SO_3$ formed, is joined by a feed stream of the same concentration in $SO_2$ and reconcentrated to a higher $SO_2$ concentration. This stream is now mixed with air and sent to the converter. The heat of reaction is used internally, in an undisclosed manner, to heat the inlet gases; the operation of the converter being, in this case, non-adiabatic.

No matter what the source of $SO_2$ it is conventional in the prior art to add enough air to provide at least 1.4 mols $O_2$ for each mol of $SO_2$ to insure a reasonable conversion efficiency, and enough air additionally to provide dilution to about 8% $SO_2$ to control the temperature rise in the reactors. With the use of a large excess of oxygen (and of nitrogen which accompanies it in air) the volume of gas which is handled is large. This necessitates handling very large gas volumes in the conventional sulfuric acid plant. They must be moved through the plant at high velocity, or the size (and cost) of the converters and other equipment must be excessive. High gas velocity, however, necessitates large blower capacity and contributes to mechanical problems and expense. The art has long sought, without success, an $SO_2$ conversion process which would ameliorate these problems by permitting the use of high-concentration $SO_2$ gas without concomitant use of large volumes of diluent gas and excess oxygen.

SUMMARY OF THE INVENTION

The present invention provides a multi-stage method for the catalytic conversion of $SO_2$ to $SO_3$ in which the sulfur dioxide concentration in the $SO_2$-containing gas may be from 25% to 100% by volume. A part of the $SO_2$-containing gas is distributed into the gas feed stream of each stage in the proportion such that the theoretical maximum adiabatic temperature rise of the gas between the feed composition and the final gas composition does not lead to a final gas temperature which exceeds substantially the upper temperature limit for the satisfactory performance of the catalyst, assuming a condition of near equilibrium of the gases leaving the stage.

The gas feed stream which is combined with the $SO_2$-containing gas delivered to the first stage is air or other oxygen-containing gas. The gas feed stream which is combined with the $SO_2$-containing gas delivered to each subsequent stage is the off-gas product from the next preceding stage. Between stages the gas stream is cooled to such an extent that the temperature of the gas mixture which enters each stage preferably is above but not greatly in excess of the ignition temperature at which the reaction is initiated. A suitable method of gas cooling is by heat exchange with the air which enters the first stage.

The total amount of $SO_2$-containing gas which is added to all stages is controlled in accordance with the desired objectives. Thus, if it is desired to convert the maximum percentage of $SO_2$ to $SO_3$ the quantity of $SO_2$-containing gas may be limited so that there is a considerable excess of oxygen over $SO_2$ in the final stage. On the other hand if the instant invention is utilized in conjunction with an absorption-desorption cycle for $SO_2$ concentration, it is desirable to add a total of $SO_2$ which may approach, or even substantially exceed, the stoichiometric equivalent of the oxygen to minimize the total quantity of gas which is treated per unit of $H_2SO_4$ produced. In this case the final off-gas is treated for $SO_2$ recovery in the absorbers prior to discharge to the atmosphere.

The temperature of ignition, using vanadium catalysts, is 410–435° C., and preferably is 380–415° C. for platinum catalysts. Vanadium catalysts should not be used for prolonged periods above 620° C. while the limit for platinum catalysts is about 560° C.

This invention may be applied to the conversion of $SO_2$ to $SO_3$ in a pressurized system as well as at atmospheric pressure. The temperature limits of operation are dependent on the catalyst composition and on the size distribution of the catalyst support and the space velocity of the gases. In any case there is a distribution of flow of the $SO_2$-rich feed gas to the several stages for the purpose of controlling the maximum temperature of the catalyst mass.

This invention, by permitting the use of a rich (high sulfur dioxide concentration) $SO_2$-containing gas under either ambient or elevated pressures, enables the use of less catalyst and greater production capacity, thus greatly lowering costs since the costs of catalytic converters is one of the main factors in $SO_2$ conversion. The $SO_3$ concentration in the gas from the final converter stage is much higher using this invention than in the practice of the prior art so that the costs of coolers and $SO_3$ absorbers is correspondingly reduced.

Briefly stated, the present invention comprises a multi-stage method for the catalytic conversion of $SO_2$ to $SO_3$, comprising a first stage in which an oxygen-containing gas is admixed with a portion of an $SO_2$-containing gas, the amount of oxygen-containing gas added being sufficient to provide the admixture at this stage with a molar proportion of oxygen in substantial stoichiometric excess of the molar proportion of $SO_2$ present in the $SO_2$-containing gas, the admixture being then passed through a first stage catalytic reaction zone to effect conversion of the $SO_2$ to $SO_3$. A plurality of subsequent stages also are provided, in each of which the reacted off-gas from the preceding stage is substantially cooled and is mixed with an additional portion of the $SO_2$-containing gas and then is passed through a further catalytic reaction zone. Such subsequent steps are repeated until the desired degree of conversion of $SO_2$ to $SO_3$ is attained. The amount of the $SO_2$-containing gas admixed with oxygen-containing gas in the first stage and with off-gas in each subsequent stage is limited to that which will result in a maximum temperature in each catalytic reaction zone, due to the adiabatic conversion of the gases in the admixture to complete equilibrium, below that at which the catalyst is substantially adversely affected. The invention also comprises the further steps of absorbing the $SO_3$ thus formed to produce sulfuric acid; and when (as is generally preferred) the total amount of sulfur dioxide introduced into the system is substantially in stoichiometric excess of the total amount of oxygen introduced with it, the unconverted $SO_2$ in the effluent gas from the $SO_3$ absorption is recycled through the process, preferably after being separated from such effluent gas and recovered in concentrated form.

Processes in the prior art attempt to complete the conversion of $SO_2$ to $SO_3$ and in order to do this they must leave substantial quantities of oxygen unused in order to meet the equilibrium conditions of low partial pressure of $SO_2$ in the gases leaving the last catalyst stage. In the process of the present invention on the other hand substantial amounts of $SO_2$ are advantageously left unconverted thereby making it possible to effect greater use of oxygen in the incoming gas to the plant and to meet equilibrium requirements in the gases leaving the last catalyst bed with a lower partial pressure of oxygen. The beneficial result of this is to permit a substantial reduction in the amount of gas that must be passed through the plant per unit of $SO_3$ produced because with lower oxygen in the off-gases less air is required.

BRIEF DESCRIPTION OF THE DRAWING

The drawing is a flow sheet of an embodiment of the invention utilizing a feed gas containing 43% $SO_2$ and air as the oxygen-containing gas.

DETAILED DESCRIPTION

In carrying out the process of the instant invention any of the usual $SO_2$-containing gases can be utilized, such as those obtained from brimstone, copper converters, tyrite roasting and the like. These gases are preferably stripped of solid, liquid, and gaseous impurities in the usual manner. An advantage of the instant process is that "rich" $SO_2$-containing gases can be used, i.e., gases containing more than about 11% $SO_2$. Prior to the instant invention it has not been possible to control the catalyst bed temperature when the $SO_2$ concentration of the gas was appreciably more than 11%, or even 8% when the composition or volume rate through the converter fluctuated. The instant invention can utilize gases having $SO_2$ concentration up to 100%.

As to the oxygen-containing gas, it is preferably air, although pure oxygen or other oxygen-containing gases can be used.

The catalyst utilized is not critical, in that it can be any of the conventional catalysts used in the conversion of $SO_2$ to $SO_3$ such as platinized asbestos, vanadium compounds, silver compounds, ferric oxide, chromium oxide, and the like.

As to equipment, the conventional standard equipment now utilized for conversion of $SO_2$ to $SO_3$ is used in carrying out the instant method. Special strippers, heat exchangers and converters (reactors), for example, are not required.

The accompanying flow sheet outlines an advantageous embodiment of the invention for converting $SO_2$ in a rich (43%) feed gas to $SO_3$ in a seven-stage process. The concentration of the feed gas and the number of stages are not critical, but are specified by way of example. The incoming feed gas is shown to be obtained by concentrating the $SO_2$ of a roaster gas, and also recovering unconverted $SO_2$ from the gas leaving the $SO_3$ absorber, in an $SO_2$ absorption-stripping circuit in which air is used to strip the $SO_2$ from the absorbent. The off-gas from the stripper is the feed gas to the converters, and is composed essentially of 43% by volume $SO_2$ plus 57% by volume primary air. However, the analysis of this recovered $SO_2$ gas stream will depend also on the type of $SO_2$ recovery system used. The recovery and recycle of $SO_2$ from the off gases would be done from economic or air pollution considerations but is not essential to the process.

In the process of the flow sheet, the incoming feed gas is shown to contain air (called for convenience "primary air"). It is not an absolute requirement that air be present in the feed gas, because all of the air necessary for the reaction may be brought into the reactor in the first stage. Due to the fact that in actual practice, seldom is pure $SO_2$ gas available, and also because to recover the recycle $SO_2$ in pure form is usually more expensive than recovery of $SO_2$-air mixtures, the feed gas will generally contain various amounts of air. It is desirable, however, that the amount of primary air contain substantially less than a stoichiometric equivalent amount of $O_2$ relative to the $SO_2$ present, for otherwise the total amount of gases that will have to be handled in the system will be undesirably large.

The feed stream which is in the majority of cases a mixture of the makeup $SO_2$ and the recycle $SO_2$, plus primary air, is then properly partitioned and sent to the various stages of the converter in such a way as to avoid a temperature rise that exceeds the maximum adiabatic temperature rise permissible. To this end, the feed gas is divided into a plurality of streams (one for each conversion stage of the process except the last stage in the exemplary process of the flow sheet). The portion of feed gas delivered to the first stage has admixed with it a further quantity of air (or other exygen-containing gas) called for convenience "auxiliary air." The amount of auviliary air added at this point is sufficient to provide, with the primary air already admixed in the feed gas, the total amount of oxygen to be available for reaction with $SO_2$ in the entire system. The proportion of feed gas to auxiliary air in the mixture introduced into the first stage catalytic converter is such that the temperature rise of the gases in the first stage, due to adiabatic conversion of $SO_2$ to $SO_3$ at equilibrium in the gas mixture, will not exceed the maximum safe temperature for the catalyst bed. Such proportioning is readily determined from knowledge of the concentration of $SO_2$ in the feed gas, its temperature, the heat capacity of the gas mixture, the equilibrium constants of the conversion reaction, etc. all of which are readily available to an operator of the process. It can also be verified, or even established, empirically by observing feed gas and off-gas temperatures and adjusting the proportioning of feed gas to auxiliary air accordingly.

The mixture of feed gas and auxiliary air introduced into the first stage converter should be at a temperature above the ignition temperature for the conversion reaction in contact with the particular catalyst used. When a vanadium catalyst is employed, then as indicated above the feed gas mixture should be at about 435° C. If necessary the mixture may be heated in any suitable manner to such temperature before it is introduced into the converter. To avoid overheating the catalyst, the temperature rise of the gas should be no greater than about 185° C. so that the temperature of the off-gas from the converter will not exceed 620° C., this being the safe upper limit for operation of the vanadium catalyst. The proportioning of feed gas and auxiliary air, then, is such that this will be the extent of the temperature rise that occurs due to the exothermic character of the conversion reaction, and the off-gas from the first stage converter will be at about 620° C.

The hot off-gas from the first stage comprises a mixture of $SO_3$ in approximate equilibrium with unreacted $SO_2$ and a substantial excess of $O_2$, plus a considerable volume of nitrogen from the air. This off-gas is cooled to a temperature near the ignition temperature for the conversion reaction (about 435° C.) and is mixed with a further portion of the $SO_2$-containing feed gas. Again, the proportion of feed gas to off-gas in the mixture is such that the temperature rise of the gases in the second-stage converter, due to adiabatic conversion of $SO_2$ to $SO_3$, will at equilibrium not exceed the maximum safe temperature for the catalyst. This proportion, while different from that for the first stage, is readily determined in substantially the same way.

The suitably proportioned mixture of feed gas and off-gas, at about the ignition temperature for conversion, now passes through the second stage catalytic converter, where additional $SO_3$ is formed and the temperature of the gas is again raised to about 620° C. The hot off-gas from this stage contains an increased amount of $SO_3$, together with approximately equilibrium concentrations of $SO_2$ and $O_2$.

Once again the hot off-gas is cooled to a temperature near the conversion ignition temperature, and more feed gas is mixed with it. As in the preceding stages, the proportioning of feed gas and off-gas is such that the temperature rise at equilibrium in the third stage converter will not exceed the safe temperature for the catalyst. This sequence of operations, involving cooling the off-gas, mixing it with more $SO_2$-containing feed gas, and passing it through a further catalytic conversion stage, is repeated as many times as desired, until the desired total proportion of $SO_2$ in the feed gas has been converted to $SO_3$. The actual proportion of feed gas to off-gas mixed at each stage various from stage to stage as $O_2$ is consumed and as the $SO_3$ concentration increases, but at each stage the proportioning is that which will give the maximum safe temperature rise at equilibrium in the ensuing converter stage. Since no oxygen (except what is present in the feed gas) enters the system after the first stage, and since the $SO_3$ concentration steadily increases from stage to stage, the proportion of feed gas to off-gas usually increases from stage to stage.

In the process of the flow sheet no feed gas is mixed with the off-gas delivered to the last (seventh) stage converter. In this case, the last stage converter serves primarily to insure that the conversion reaction has proceeded more fully and that substantially the maximum attainable conversion of $SO_2$ to $SO_3$ occurs. This may be facilitated by adding to the next to last (sixth) stage less than the amount of feed gas required to attain a maximum permissible temperature rise in such stage and thus produce an off-gas from such stage, for introduction into the last stage, in which a more complete conversion has taken place. In the final stage, when no additional $SO_2$-containing gas is added, the temperature rise will be small and thus permit a greater conversion of $SO_2$ to $SO_3$.

The off-gas from the final stage may contain a substantial excess of oxygen and a corresponding small $SO_2$ concentration. However, it is preferred to operate the process with an excess of $SO_2$ and a substantial stoichiometric deficiency of $O_2$ so as to materially reduce the volume of gases that must be passed through the system, and thereby permit the use of more compact, smaller equipment. The final stage off-gas also will contain a substantial concentration of $SO_3$ and the nitrogen of all the primary and auxiliary air, together with small amounts of other gases from the $SO_2$ source and the air. This final off-gas is delivered to an $SO_3$ absorber where the $SO_3$ product is absorbed in sulfuric acid, in conventional fashion. It is an advantage of the invention that the high concentration of $SO_3$ in the off-gas from the last stage converter allows for the $SO_3$ absorber to be of small size, and also it facilitates the production of oleum.

When, as is preferred, the off-gas from the last stage contains a substantial amount of unconverted $SO_2$, the gas effluent from the $SO_3$ absorber is treated to separate and recover its $SO_2$ content. This is shown on the flowsheet as being done by a conventional $SO_2$ absorption-stripping system, which is also used to separate and concentrate the $SO_2$ of a roaster gas, producing a rich $SO_2$-air mixture. Alternatively, the separated $SO_2$ may be recovered in even more concentrated form (e.g. up to 100% $SO_2$ gas). Instead of introducing roaster gas into the absorption-stripping system, the recovered $SO_2$ may be mixed with fresh incoming $SO_2$ from some other source prior to proportioning the feed gas to the several converter stages, as described above. Other circulation systems can also be employed, in which, for example, the recovered $SO_2$ is recycled to the converters separately from the feed gas.

Although not specifically diagramed on the flowsheet, an advantageous means for cooling the hot off-gas from some or all converter stages is by heat exchange with the auxiliary air. In this manner the mixture of feed gas and auxiliary air supplied to the first stage may be brought to the desired ignition temperature with heat produced in the process.

If desired, pressures which are substantially above atmospheric can be used with the same stage-wise addition of the $SO_2$-containing gas as described above.

The process is described above with reference to the flowsheet as one in which the permissible temperature rise in each stage is about 185° C. This rise can be greater if the gas feed is cooler than 435° C. and the catalyst is operated above 620° C. For short periods of operation a temperature rise up to 250° C. can be tolerated.

Following is a specific example determined by engineering computation of a process carried out in accordance with the invention.

A feed gas assumed to contain about 16% by volume $SO_2$ is blended with the tail gas leaving the $SO_3$ absorption tower. This tail gas contains about 16.4% by volume $SO_2$. The blended gas is sent to the $SO_2$ absorber where the $SO_2$ is preferentially absorbed and separated from its accompanying gases, chiefly nitrogen. The absorbing medium is then stripped with air in order to give a gas containing 43.5% $SO_2$ by volume, the balance being air. The resulting $SO_2$-containing gas is proportioned among six catalytic converter stages in amounts indicated in Table I. The temperature of the $SO_2$-containing gas is 435° C. and the temperature of the off-gas from each stage and as delivered to the next succeeding stage is indicated in Table I. The catalytic converters are of the conventional vanadium oxide type. Auxiliary air in the amount indicated in the table is preheated to 435° C. and mixed with that portion of the $SO_2$-containing feed gas delivered to the first converter stage. The feed to each subsequent stage is the combined mixture of feed gas supply to the stage and off-gas from the preceding stage.

TABLE 1

| Gas | 1st stage | | | | | | 2d stage | | | |
|---|---|---|---|---|---|---|---|---|---|---|
| | $SO_2$ mix from stripper | Aux. air | $SO_2$ mix to 1st stage | 430° C., total flow to 1st stage | Conv. 1st stage | 620° C., exit flow from 1st stage | $SO_2$ mix to 2d stage | 430° C., total flow to 2d stage | Conv. 2d stage | 620° C., exit flow from 2d stage |
| $SO_2$ | 35.280 | 0.000 | 2.021 | 2.021 | −1.517 | 0.504 | 3.058 | 3.562 | −2.150 | 1.412 |
| $O_2$ | 9.627 | 3.970 | 0.551 | 4.521 | −0.785 | 3.763 | 0.834 | 4.597 | −1.025 | 3.522 |
| $N_2$ | 36.196 | 14.927 | 3.073 | 17.000 | 0.000 | 17.000 | 3.139 | 20.139 | 0.000 | 20.139 |
| $SO_3$ | 0.000 | 0.000 | 0.000 | 0.000 | 1.517 | 1.517 | 0.000 | 1.517 | 2.150 | 3.667 |
| Total | 81.103 | 18.897 | 4.645 | 23.542 | | 22.784 | 7.031 | 29.815 | | 28.740 |

| Gas | 3d stage | | | | 4th stage | | | |
|---|---|---|---|---|---|---|---|---|
| | $SO_2$ mix to 3d stage | 430° C., total flow to 3d stage | Conv. 3d stage | 620° C., exit flow from 3d stage | $SO_2$ mix to 4th stage | 430° C., total flow to 4th stage | Conv. 4th stage | 620° C., exit flow from 4th stage |
| $SO_2$ | 4.692 | 6.104 | −3.305 | 3.069 | 7.598 | 10.667 | −4.461 | 6.206 |
| $O_2$ | 1.280 | 4.802 | −1.517 | 3.285 | 2.073 | 5.358 | −2.230 | 3.128 |
| $N_2$ | 4.814 | 24.953 | 0.000 | 24.953 | 7.795 | 32.748 | 0.000 | 32.748 |
| $SO_3$ | 0.000 | 3.667 | 3.035 | 6.702 | 0.000 | 6.702 | 4.462 | 11.164 |
| Total | 10.786 | 39.526 | | 38.009 | 17.466 | 55.475 | | 53.246 |

| Gas | 5th stage | | | | | 6th stage | | | |
|---|---|---|---|---|---|---|---|---|---|
| | Exit flow from 4th stage | $SO_2$ mix to 5th stage | 430° C., total flow to 5th stage | Conv. 5th stage | 620° C., exit flow from 5th stage | $SO_2$ mix to 6th stage | 430° C., total flow to 6th stage | Conv. 6th stage | 572.9° C., exit flow from 6th stage |
| $SO_2$ | 6.206 | 12.761 | 18.967 | −6.855 | 12.112 | 5.150 | 17.262 | −5.838 | 11.424 |
| $O_2$ | 3.128 | 3.482 | 6.610 | −3.428 | 3.182 | 1.405 | 4.587 | −2.919 | 1.668 |
| $N_2$ | 32.748 | 13.093 | 45.841 | 0.000 | 45.841 | 5.283 | 51.124 | 0.000 | 51.124 |
| $SO_3$ | 11.164 | 0.000 | 11.164 | 6.854 | 18.018 | 0.000 | 18.018 | 5.838 | 23.856 |
| Total | 53.246 | 29.336 | 82.582 | | 79.153 | 11.838 | 90.991 | | 88.072 |

| Gas | 7th stage | | | | Exit flow from $SO_3$ absorber and entering $SO_2$ recovery | Feed gas flow from pyrites roasting | Waste gas to atmosphere | Air to stripper | $SO_2$ mix from stripper |
|---|---|---|---|---|---|---|---|---|---|
| | $SO_2$ mix to 7th stage | 522° C., total flow to 7th stage | Conv. to 7th stage | 550° C., exit flow from 7th stage entering $SO_3$ absorber | | | | | |
| $SO_2$ | 0.000 | 11.424 | −1.888 | 10.236 | 10.236 | 25.044 | Traces | | 35.280 |
| $O_2$ | 0.000 | 1.668 | −0.594 | 1.074 | 1.074 | 1.7850 | 18.924 | 9.627 | 9.627 |
| $N_2$ | 0.000 | 51.124 | 0.000 | 51.124 | 51.124 | 113.800 | 164.924 | 36.196 | 36.196 |
| $SO_3$ | 0.000 | 23.856 | 1.188 | 25.044 | 0.000 | 0.000 | 0.000 | | |
| Total | 0.000 | 88.072 | | 87.478 | 62.433 | 156.694 | 183.848 | 45.823 | 81.103 |

The off-gas from the seventh converter stage contains the entire amount of $SO_3$ product. It will be noted that the $SO_3$ concentration is high (25%). It is absorbed in a conventional absorber, to which 93% $H_2SO_4$ is supplied as the absorbent, the product being 98% acid.

The effluent gases from the $SO_3$ absorber contains the excess unreacted $SO_2$ introduced with the feed gas. These effluent gases pass through a conventional $SO_2$ recovery system, in which the $SO_2$ is first absorbed in water to separate it from the remaining gases (chiefly nitrogen) and then is stripped from the absorbent with air to form the feed gas. The off-gases from which the $SO_2$ has been removed are discharged to the atmosphere.

What is claimed is:

1. The multi-stage method for the catalytic conversion of $SO_2$ to $SO_3$ wherein the maximum temperature in each stage reaction zone is maintained below that at which the catalyst in the reaction zone is substantially adversely affected comprising:
    (a) a first stage in which (i) an oxygen-containing gas is admixed with a first portion of a gas containing from 25% to 100% $SO_2$, the amount of oxygen-containing gas added being sufficient to provide the admixture with a molar proportion of $O_2$ in substantial stoichiometric excess of the molar proportion of $SO_2$ present in said admixture, and (ii) the admixture is passed through a first-stage catalytic reaction zone to effect conversion of the $SO_2$ to $SO_3$,
    (b) and a plurality of subsequent stages in each of which (i) the reacted off-gas from the preceding stage is cooled to a temperature near the ignition temperature and mixed with an additional portion of said $SO_2$-containing gas containing from 25% to 100% $SO_2$ and (ii) then is passed through a further catalytic reaction zone,
    (c) said subsequent stages being repeated until the desired degree of conversion of $SO_2$ to $SO_3$ is attained, and
    (d) the amount of the $SO_2$-containing gas admixed with oxygen-containing gas in this first stage and with off-gas in each subsequent stage being limited to that which will result in a maximum temperature in each catalytic reaction zone, due to the adiabatic temperature rise of the gases, near equilibrium, which is below the temperature at which the catalyst in the catalytic reaction zones is substantially adversely affected.

2. The method of claim 1 wherein the oxygen-containing gas is air and the total amount thereof admixed with the $SO_2$-containing gas is such as to provide a molar proportion of $O_2$ substantially less than that equivalent to the total amount of $SO_2$ in the $SO_2$-containing gas admitted to all stages.

3. The method of claim 1 wherein the admixture as it enters the catalytic reaction zone of each stage is heated at least to the ignition temperature thereof and the reacted admixture is cooled prior to passage through the subsequent catalytic reaction zone to a temperature above said ignition temperature.

4. The method of claim 1 wherein the catalyst is a vanadium compound, and the amount of $SO_2$-containing gas present in the gas admixture passed into each catalytic reaction zone is that which will result in a temperature of the off-gas substantially above about 400° C. but below 650° C.

5. The method according to claim 1 wherein a portion of the oxygen required for converting the $SO_2$ to $SO_3$ is present in the $SO_2$-containing gas and the remainder of such oxygen is added in its entirety to that portion of the $SO_2$-containing gas introduced into the first stage of the process.

6. In a multi-conversion stage process for producing $SO_3$ in which a mixture of $SO_2$ and $O_2$ is passed serially through a sequence of catalytic converter stages, the improvement which comprises fortifying the offgas product containing oxygen and $SO_2$ from one converter stage with a gas containing from 25% to 100% $SO_2$ in such proportion that the fortified gas mixture is within the composition range which results in a temperature rise of the gas mixture, near equilibrium, of less than 250° C. and below that at which the catalyst in the converter stage is substantially adversely affected, and introducing said fortified mixture into the next converter stage in the series.

7. The method of claim 6 in which the gas containing more than 25% $SO_2$ is obtained by the stripping with air of a solution of $SO_2$ in an absorbent.

References Cited
UNITED STATES PATENTS

| | | | |
|---|---|---|---|
| 677,670 | 7/1901 | Krauss et al. | 23—176 |
| 719,332 | 1/1903 | Herreshoff | 23—176 |
| 2,043,202 | 6/1936 | Merriam | 23—176 X |
| 2,104,858 | 1/1938 | Ferguson | 23—176 |
| 2,128,108 | 8/1938 | Tyrer et al. | 23—175 |
| 2,111,389 | 3/1938 | Merriam | 23—178 R |

EARL C. THOMAS, Primary Examiner

C. B. RODMAN, Assistant Examiner

U.S. Cl. X.R.

23—168